United States Patent
Deng

(10) Patent No.: US 9,990,339 B1
(45) Date of Patent: Jun. 5, 2018

(54) SYSTEMS AND METHODS FOR DETECTING CHARACTER ENCODINGS OF TEXT STREAMS

(75) Inventor: Yunpeng Deng, Beijing (CN)

(73) Assignee: Symantec Corporation, Mountain View, CA (US)

( * ) Notice: Subject to any disclaimer, the term of this patent is extended or adjusted under 35 U.S.C. 154(b) by 1145 days.

(21) Appl. No.: 13/443,677

(22) Filed: Apr. 10, 2012

(51) Int. Cl.
G06F 17/30 (2006.01)
G06F 17/22 (2006.01)

(52) U.S. Cl.
CPC .................... *G06F 17/2217* (2013.01)

(58) Field of Classification Search
CPC .................................. G06F 17/30705
USPC ................ 707/687, 705, 790, 821, 964
See application file for complete search history.

(56) References Cited

U.S. PATENT DOCUMENTS 6,131,082 A * 10/2000 Hargrave ............ G06F 17/2827 704/7
2011/0213736 A1 * 9/2011 Diao .................... G06N 99/005 706/12

OTHER PUBLICATIONS

Wikipedia; Charset Detection; http://en.wikipedia.org/wiki/Charset_detection; Apr. 27, 2011.
Doxygen; ucsdet.h File Reference; http://www.icu-project.org/apiref/icu4c/ucsdet_8h.html; Apr. 6, 2012.
MSDN; IMultiLanguage2::DetectInputCodepage; http://msdn.microsoft.com/en-us/library/aa920101.aspx; Apr. 8, 2010.
SourceForge.net; jChardet; http://jchardet.sourceforge.net/; Jul. 10, 2003.
"ICU", http://site.icu-project.org/, as accessed on Feb. 3, 2012, (Mar. 1, 2009).
"uchardet", http://code.google.com/p/uchardet/, as accessed on Feb. 3, 2012, (Jul. 29, 2011).
"Brightmail", http://en.wikipedia.org/wiki/Brightmail, as accessed Feb. 3, 2012, Wikipedia, (Feb. 7, 2010).
"n-gram", http://en.wikipedia.org/wiki/N-gram, as accessed Feb. 3, 2012, Wikipedia, (Dec. 15, 2005).

* cited by examiner

*Primary Examiner* — Sana A Al-Hashemi
(74) *Attorney, Agent, or Firm* — FisherBroyles, LLP

(57) ABSTRACT

A computer-implemented method for detecting character encodings of text streams may include 1) identifying a request to identify a character encoding of a text stream, 2) dividing the text stream to identify a plurality of n-grams within the text stream, 3) identifying a plurality of vectors within a vector space, each vector representing a potential character encoding by a plurality of expected n-grams within the potential character encoding, 4) generating, based on the plurality of n-grams within the text stream and on an inverse frequency of appearance of each of the plurality of n-grams within the plurality of vectors, a representative vector describing the text stream, and 5) identifying the character encoding of the text stream based on identifying a similarity between the representative vector and a neighboring vector within the plurality of vectors representing the character encoding. Various other methods, systems, and computer-readable media are also disclosed.

20 Claims, 6 Drawing Sheets

SYSTEMS AND METHODS FOR DETECTING CHARACTER ENCODINGS OF TEXT STREAMS

BACKGROUND

A character encoding may determine how raw data is represented as textual data for purposes of processing, rendering, and/or analyzing the data as text (e.g., by mapping data values to characters). Ordinarily, in order to correctly process textual data, traditional systems for reading textual data may either assume a specified character encoding by convention (e.g., assume that any input text is encoding using a predetermined character encoding) or identify metadata attached to the textual data which specifies a character encoding for the textual data.

Unfortunately, in some cases metadata that specifies a character encoding for textual data may be absent or incorrect. Traditional character encoding detection systems may analyze the raw textual data for patterns (e.g., for recurring byte sequences used in text with known character encodings) in order to guess the correct character encoding for the textual data from among hundreds of standardized character encodings. However, these traditional character encoding detection systems may operate with substantial limitations. For example, some character encodings may use similar mappings for some characters, potentially causing false positives. In some cases, traditional character encoding detection systems may mistake a textual document using a character encoding that includes two character sets (e.g., Latin characters and Han characters) for a textual document using a character encoding with only one of the character sets (e.g., only Latin characters) but with the same mapping for that character set. Accordingly, these traditional character encoding detection systems may frequently fail to detect the correct character encoding for a textual document with multiple languages, especially when the majority of the document only uses one of the languages. Accordingly, the instant disclosure identifies and addresses a need for additional and improved systems and methods for detecting character encodings of text streams.

SUMMARY

As will be described in greater detail below, the instant disclosure generally relates to systems and methods for detecting character encodings of text streams by giving greater weight to data sequences that are uncommon across character encodings when selecting features of text streams to compare with features of character encodings. In one example, a computer-implemented method for detecting character encodings of text streams may include 1) identifying a request to identify a character encoding of a text stream, 2) dividing the text stream to identify a plurality of n-grams within the text stream, 3) identifying a plurality of vectors within a vector space, each vector representing a potential character encoding by a plurality of expected n-grams within the potential character encoding, 4) generating, based at least in part on the plurality of n-grams within the text stream and based at least in part on an inverse frequency of appearance of each of the plurality of n-grams within the plurality of vectors, a representative vector describing the text stream, and 5) identifying the character encoding of the text stream based on identifying a similarity between the representative vector and a neighboring vector within the plurality of vectors representing the character encoding.

In some examples, identifying the request to identify the character encoding of the text stream may include determining that the text stream lacks a metadata indicator of a defined character encoding for the text stream. Additionally or alternatively, identifying the request may include determining that the metadata indicator of the defined character encoding for the text stream is incorrect. In one embodiment, identifying the request may include determining that a probability that the text stream includes more than one language is above a predetermined threshold.

In some embodiments, generating the representative vector describing the text stream may include 1) identifying a term frequency with which the n-gram appears in the text stream, 2) identifying the inverse frequency of appearance of the n-gram by calculating a logarithm of a proportion of vectors within the plurality of vectors including the n-gram, and 3) weighting the term frequency by the inverse frequency of appearance. Additionally or alternatively, generating the representative vector may include 1) identifying a target dimensionality of the representative vector, 2) identifying a weighted term frequency with which each n-gram within the plurality of n-grams appears in the text stream, 3) identifying a subset of the plurality of n-grams with highest weighted term frequencies, and 4) populating the representative vector with the subset of the plurality of n-grams. In one example, generating the representative vector may involve generating the representative vector based on the plurality of vectors being represented with a first dimensionality. In this example, identifying the character encoding of the text stream may include identifying the similarity between the representative vector and the neighboring vector based on the plurality of vectors being represented with a second dimensionality that is smaller than the first dimensionality.

In one example, identifying the character encoding of the text stream may include determining that the neighboring vector is the nearest neighbor to the representative vector within the vector space. Additionally or alternatively, identifying the character encoding of the text stream may include identifying a character encoding that includes a first character set used within a first language but not a second language and a second character set used within the second language but not the first language.

In some examples, the computer-implemented method may also include 1) rendering the text stream according to the character encoding of the text stream and/or 2) analyzing textual content of the text stream according to the character encoding of the text stream.

In one embodiment, a system for implementing the above-described method may include 1) an identification module programmed to identify a request to identify a character encoding of a text stream, 2) a division module programmed to divide the text stream to identify a plurality of n-grams within the text stream, 3) a vector module programmed to identify a plurality of vectors within a vector space, each vector representing a potential character encoding by a plurality of expected n-grams within the potential character encoding, 4) a generation module programmed to generate, based at least in part on the plurality of n-grams within the text stream and based at least in part on an inverse frequency of appearance of each of the plurality of n-grams within the plurality of vectors, a representative vector describing the text stream, and 5) a similarity module programmed to identify the character encoding of the text stream based on identifying a similarity between the representative vector and a neighboring vector within the plurality of vectors representing the character encoding. The system may also include at least one processor configured to execute the identification module, the division module, the vector module, the generation module, and the similarity module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a request to identify a character encoding of a text stream, 2) divide the text stream to identify a plurality of n-grams within the text stream, 3) identify a plurality of vectors within a vector space, each vector representing a potential character encoding by a plurality of expected n-grams within the potential character encoding, 4) generate, based at least in part on the plurality of n-grams within the text stream and based at least in part on an inverse frequency of appearance of each of the plurality of n-grams within the plurality of vectors, a representative vector describing the text stream, and 5) identify the character encoding of the text stream based on identifying a similarity between the representative vector and a neighboring vector within the plurality of vectors representing the character encoding.

As will be explained in greater detail below, by giving greater weight to data sequences that are uncommon across character encodings when selecting features of text streams to compare with features of character encodings, the systems and methods described herein may use high-information features of text streams to distinguish between potentially similar candidate character encodings. Accordingly, in some examples, these systems and methods may more accurately identify character encodings for text streams with multiple languages.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
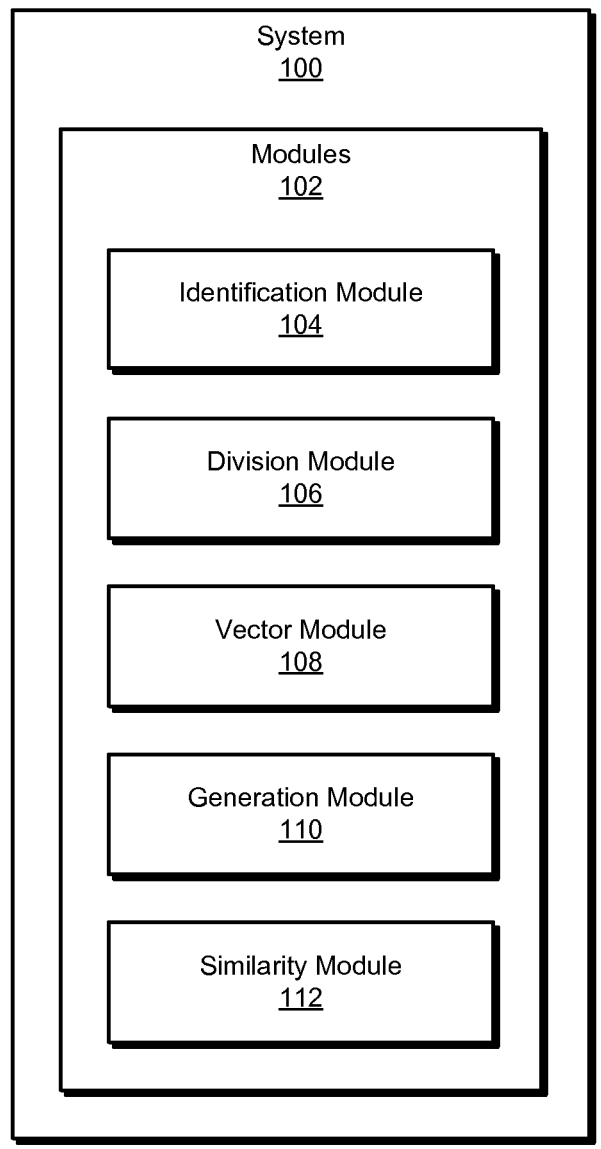
FIG. 1 is a block diagram of an exemplary system for detecting character encodings of text streams.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
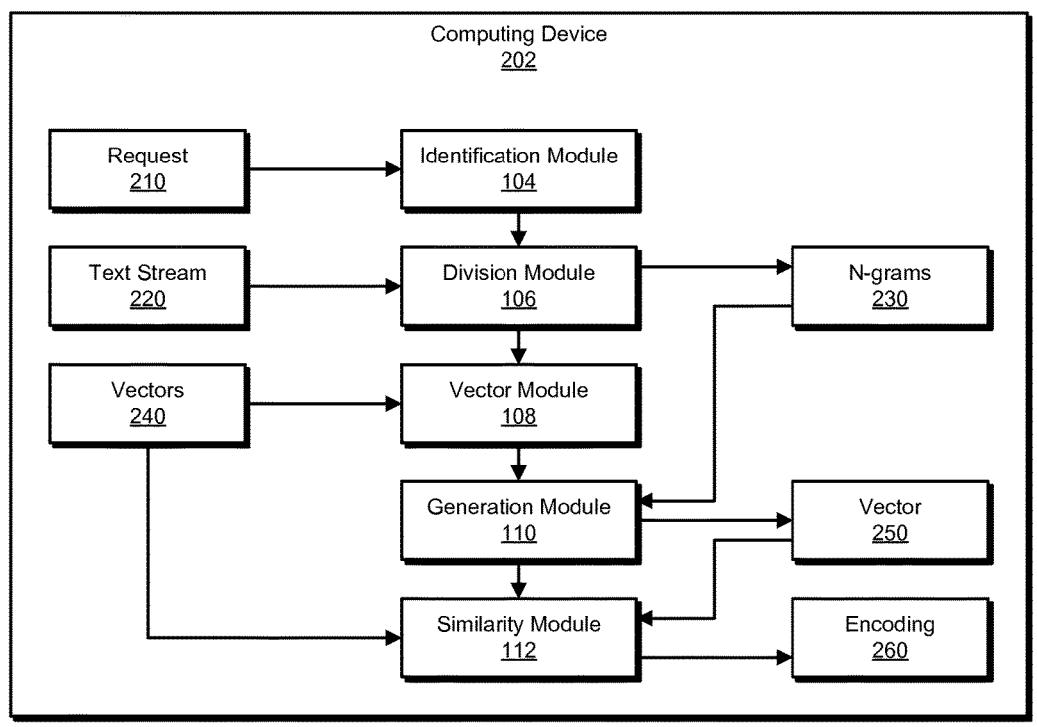
FIG. 2 is a block diagram of an exemplary system for detecting character encodings of text streams.

The following will provide, with reference to FIGS. 1-2, detailed descriptions of exemplary systems for detecting character encodings of text streams. Detailed descriptions of corresponding computer-implemented methods will also be provided in connection with FIG. 3. Detailed descriptions of exemplary textual data will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting character encodings of text streams. As illustrated in this figure, exemplary system 100 may include one or more modules 102 for performing one or more tasks. For example, and as will be explained in greater detail below, exemplary system 100 may include an identification module 104 programmed to identify a request to identify a character encoding of a text stream. Exemplary system 100 may also include a division module 106 programmed to divide the text stream to identify a plurality of n-grams within the text stream. Exemplary system 100 may additionally include a vector module 108 programmed to identify a plurality of vectors within a vector space, each vector representing a potential character encoding by a plurality of expected n-grams within the potential character encoding.

In addition, and as will be described in greater detail below, exemplary system 100 may include a generation module 110 programmed to generate, based at least in part on the plurality of n-grams within the text stream and based at least in part on an inverse frequency of appearance of each of the plurality of n-grams within the plurality of vectors, a representative vector describing the text stream. Exemplary system 100 may also include a similarity module 112 programmed to identify the character encoding of the text stream based on identifying a similarity between the representative vector and a neighboring vector within the plurality of vectors representing the character encoding. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 configured to detect character encodings of text streams (e.g., a text stream 220).

In one embodiment, one or more of modules 102 from FIG. 1 may, when executed by at least one processor of computing device 202, facilitate computing device 202 in detecting character encodings of text streams. For example, and as will be described in greater detail below, identification module 104, division module 106, vector module 108, generation module 110, and/or similarity module 112 may cause computing device 202 to 1) identify a request 210 to identify a character encoding of text stream 220, 2) divide text stream 220 to identify a plurality of n-grams 230 within text stream 220, 3) identify a plurality of vectors 240 within a vector space, each vector representing a potential character encoding by a plurality of expected n-grams within the potential character encoding, 4) generate, based at least in part on n-grams 230 within text stream 220 and based at least in part on an inverse frequency of appearance of each of n-grams 230 within vectors 240, a representative vector 250 describing text stream 220, and 5) identify a character encoding 260 of text stream 220 based on identifying a similarity between vector 250 and a neighboring vector within vectors 240 representing encoding 260.

Computing device 202 generally represents any type or form of computing device capable of reading computer-executable instructions. Examples of computing device 202 include, without limitation, desktops, servers, laptops, tablets, cellular phones, personal digital assistants (PDAs), multimedia players, embedded systems, combinations of one or more of the same, exemplary computing system 510 in FIG. 5, or any other suitable computing device.

Figure 3:
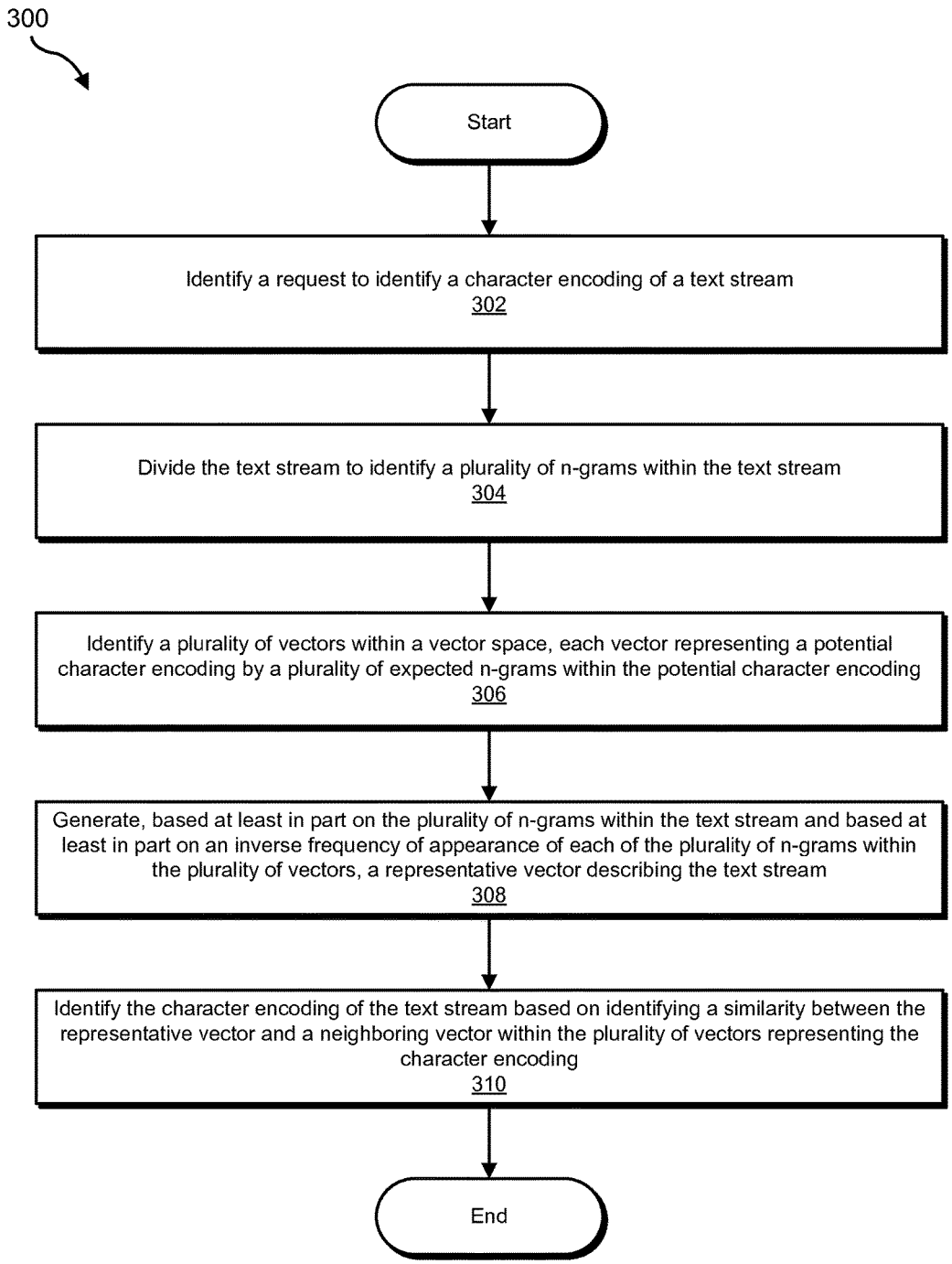
FIG. 3 is a flow diagram of an exemplary method for detecting character encodings of text streams.

FIG. 3 is a flow diagram of an exemplary computer-implemented method 300 for detecting character encodings of text streams. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to identify a character encoding of a text stream. For example, at step 302 identification module 104 may, as part of computing device 202 in FIG. 2, identify request 210 to identify a character encoding of text stream 220.

As used herein, the phrase "character encoding" may refer to any character encoding, character map, code page, and/or specification for representing and/or interpreting data as text. In some examples, a character encoding may include one or more character sets (e.g., a set of target characters used in the character encoding). In at least one example, a character set may appear in more than one character encodings. In some examples, a character encoding may map byte codes to characters. As used herein, the phrase "text stream" may refer to any stream, file, document, object, and/or resource with data that may be encoded as text.

Identification module 104 may identify the request in any of a variety of contexts. For example, identification module 104 may receive the request as a message (e.g., from an application). Additionally or alternatively, identification module 104 may receive the request simply by receiving the text stream and/or a reference to the text stream.

In some examples, identification module 104 may identify the request by identifying a need to identify the character encoding. For example, identification module 104 may determine that the text stream lacks a metadata indicator of a defined character encoding for the text stream. As used herein, the phrase "metadata indicator" may refer to any data used to specify a character encoding. Examples of metadata indicators may include, without limitation, byte order marks (e.g., for text files) and charset fields of Hypertext Markup Language files. In another example, identification module 104 may determine that the metadata indicator of the defined character encoding for the text stream is incorrect. For example, identification module 104 may determine that the text stream includes byte codes that do not correspond to any characters in the defined character encoding. Additionally or alternatively, identification module 104 may determine that the defined character encoding is unreliable (e.g., based on a potential data corruption, based on a source of the text stream and/or defined character encoding, etc.).

In one example, identification module 104 may identify the a need to identify the character encoding using one or more of the systems and methods described herein by determining that the probability that the text stream includes more than one language is above a predetermined threshold. For example, identification module 104 may determine, based on a source of the text stream (e.g., based on a database from which the text stream was retrieved, based on metadata describing the text stream, based on a network address from which the text stream was retrieved, etc.), that the text stream likely includes more than one language (e.g., with a given probability), and that the systems and methods described herein may more accurately identify the correct character encoding of the text stream than an alternative system or method.

As illustrated in FIG. 3, at step 304 one or more of the systems described herein may divide the text stream to identify a plurality of n-grams within the text stream. For example, at step 304 division module 106 may, as part of computing device 202 in FIG. 2, divide text stream 220 to identify n-grams 230 within text stream 220.

As used herein, the term "n-gram" may refer to any sequence of data units within a text stream. For example, the term "n-gram" may refer to a sequence of bytes within the text stream. The n-grams may include any suitable sequence length. For example, the n-grams may include 2-grams (e.g., two-byte sequences). Additionally or alternatively, the n-grams may include 4-grams (e.g., four-byte sequences). In some examples, division module 106 may divide the text stream by creating and/or identifying an n-gram starting with each byte in the text stream.

Figure 4:
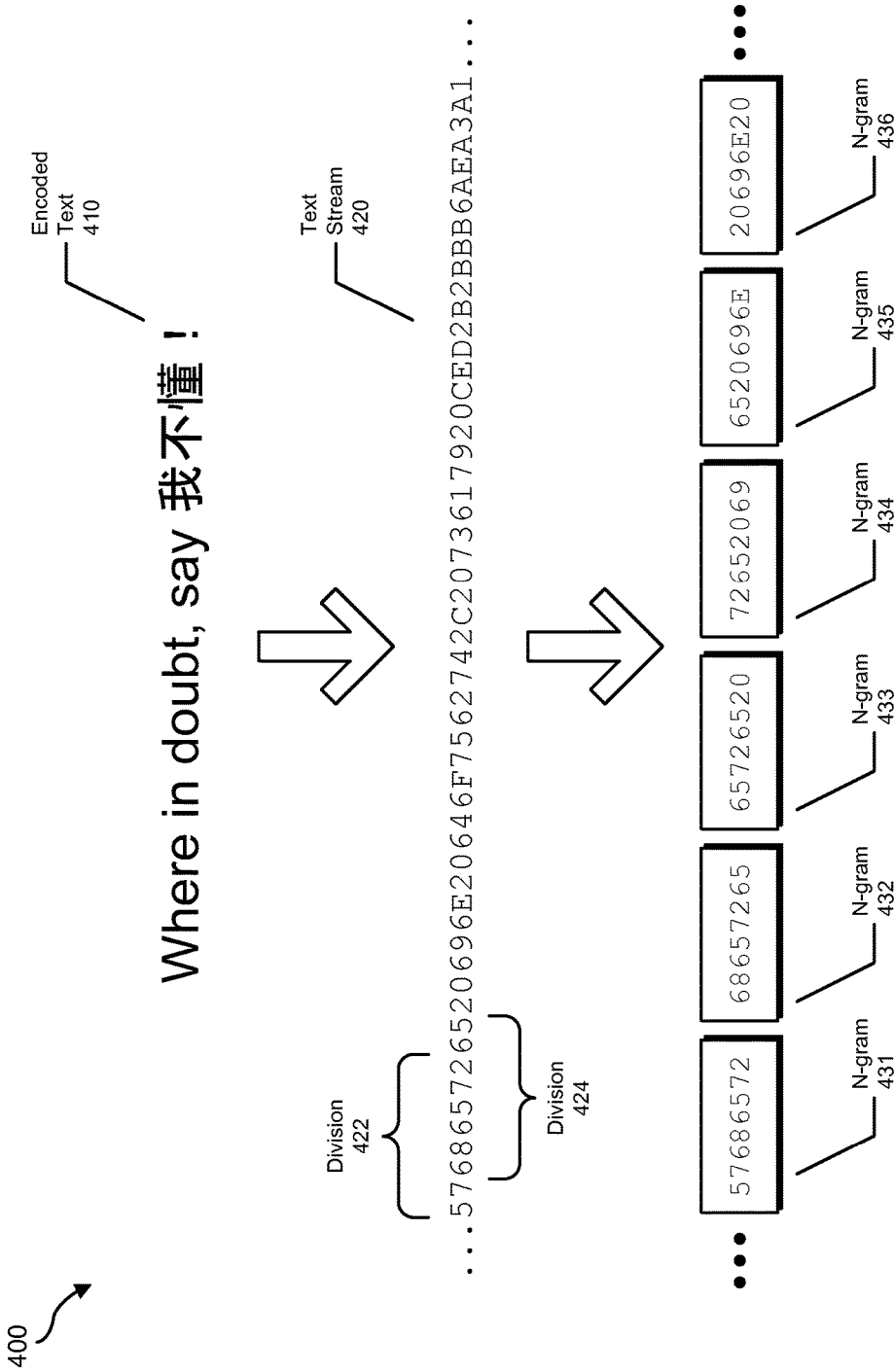
FIG. 4 is an illustration of exemplary textual data.

FIG. 4 illustrates exemplary textual data 400. As shown in FIG. 4, exemplary textual data 400 may be represented as encoded text 410. As another example, exemplary textual data 400 may be represented as an unencoded text stream 420. In some examples, a system may not have access to the character encoding used in encoded text 410. For example, a writer may create encoded text 410. Subsequently, a system may retrieve and/or receive the corresponding text stream 420 without character encoding information. Using FIG. 4 as an example, at step 304 division module 106 may divide text stream 420 to identify a plurality of n-grams. For example, division module 106 may identify n-grams 431, 432, 433, 434, 435, and 436 within text stream 420. As shown in FIG. 4, division module 106 may divide text stream 420 by identifying an n-gram starting with each byte (e.g., two-digit hexadecimal number) in the text stream. Accordingly, division module 106 may identify a division 422 to identify n-gram 431, a division 424 to identify n-gram 432, etc.

Returning to FIG. 3, at step 306 one or more of the systems described herein may identify a plurality of vectors within a vector space, each vector representing a potential character encoding by a plurality of expected n-grams within the potential character encoding. For example, at step 306 vector module 108 may, as part of computing device 202 in FIG. 2, identify vectors 240 within a vector space, each vector representing a potential character encoding by a plurality of expected n-grams within the potential character encoding.

As used herein, the term "vector" may refer to any multi-dimensional data structure and/or data point in a multi-dimensional space. Accordingly, as used herein, the phrase "vector space" may refer to any multi-dimensional space in which two or more vectors may be considered to exist and within which two or more vectors may be compared (e.g., by a distance metric). In some examples, one or more of the vectors described herein may describe a predominance of, an expected predominance of, and/or a weighted predominance of n-grams with respect to a text stream, a corpus of text streams, and/or an expected corpus of text streams corresponding to a character encoding.

The plurality of vectors may include any suitable representations of corresponding character encodings. In some examples, one or more of the systems described herein may generate one or more of the vectors and/or identify one or more vectors generated by 1) collecting a corpus of text documents (e.g., news articles, books, etc.) for each language to be represented, 2) create a training set from the corpus for each language, 3) for each training set of a language, build the possible encoding sets (e.g., for the Japanese language, build encoding sets for character encodings EUC-JP, Shift-JIS, UTF-8, UTF-16, etc.), 4) for each encoding set, extract the most frequent n-grams (e.g., the top 100 n-grams, the top 10000 n-grams, etc.), 5) sort the most frequent n-grams by frequency and use the sorted n-grams as a vector to represent the corresponding character encoding.

Vector module 108 may identify the plurality of vectors in any suitable manner. In some examples, vector module 108 may retrieve the plurality of vectors from a database.

At step 308 one or more of the systems described herein may generate, based at least in part on the plurality of n-grams within the text stream and based at least in part on an inverse frequency of appearance of each of the plurality of n-grams within the plurality of vectors, a representative vector describing the text stream. For example, at step 308 generation module 110 may, as part of computing device 202 in FIG. 2, generate, based at least in part on n-grams 230 within text stream 220 and based at least in part on an inverse frequency of appearance of each of n-grams 230 within vectors 240, vector 250 describing text stream 220.

As used herein, the phrase "inverse frequency of appearance" may refer to any value that tends to decrease as a corresponding n-gram is more common across vectors.

Generation module 110 may generate the representative vector in any of a variety of ways. For example, generation module may generate the representative vector by 1) identifying a term frequency with which the n-gram appears in the text stream, 2) identifying the inverse frequency of appearance of the n-gram by calculating a logarithm of a proportion of vectors within the plurality of vectors including the n-gram, and 3) weighting the term frequency by the inverse frequency of appearance. As used herein, the phrase "term frequency" may refer to any value that correlates with the number of appearances of an n-gram within a document. In some examples, generation module 110 may compute a TF-IDF (term frequency-inverse document frequency) value for each n-gram, where the inverse document frequency corresponds to vectors within the plurality of vectors instead of documents within a corpus. For example, generation module 110 may compute a term frequency $TF(t)$ for the frequency with which the n-gram t appears in the text stream, a weight $IDF(t)=\log(D/d)$, where D is the total number of vectors in the plurality of vectors and d is the number of vectors in which the n-gram t appears, and then calculate $TF(t)*IDF(t)$ to weight the term frequency by the inverse document frequency. By weighting the term frequency with the inverse document frequency, the systems and methods described herein may place less importance on common n-grams (e.g., which provide little information to distinguish between candidate character encodings). For example, $\log(D/d)=0$ where $D=d$, indicating that an n-gram that appears in all vectors yields no information.

Using a specific example to illustrate, the plurality of vectors may include 74 vectors representing 74 character sets in a 4-gram vector space. A 4-gram value 0x41000000 representing the Latin character A may occur in 45 of the vectors. Accordingly, the IDF weight of the Latin character A may be $\log(74/45)\approx 0.216$. In this same example, another 4-gram value 0xbcbccaf5 may represent a Simplified Chinese character that appears in only 2 of the vectors. Accordingly, the IDF weight of the Simplified Chinese character may be $\log(74/2)\approx 1.568$ (e.g., a higher weight than the Latin character A). If the Latin character A appears 25 times in the text stream, the weighted term frequency value may be $25*0.216=5.4$. If the Simplified Chinese character appears 4 times in the text stream, the weighted term frequency value may be $4*1.568=6.272$. Accordingly, the Simplified Chinese character may be given a greater overall weight, even though the Latin character A appears more frequently within the text stream.

In some examples, generation module 110 may generate the representative vector with a specified size. For example, generation module 110 may generate the representative vector by 1) identifying a target dimensionality of the representative vector, 2) identifying a weighted term frequency with which each n-gram within the plurality of n-grams appears in the text stream, 3) identifying a subset of the plurality of n-grams with the highest weighted term frequencies, and 4) populating the representative vector with the subset of the plurality of n-grams. For example, generation module 110 may identify a target dimensionality (e.g., to create a representative vector of 100 n-grams, of 400 n-grams, etc.) and identify the n-grams with the highest TD-IDF values as described earlier (e.g., the highest 100 values, the highest 400 values, etc.).

In some examples, one or more of the systems described herein may use different dimensionalities for different tasks. For example, generation module 110 may generate the representative vector based on the plurality of vectors being represented with a first dimensionality. For example, when determining the TD-IDF values of each n-gram, generation module 110 may draw on versions of the plurality of vectors with large dimensionalities (e.g., between 5000 and 10000 n-grams). However, generation module 110 may use a second dimensionality (e.g., the target dimensionality of the representative vector) that may be smaller (e.g., between 100 and 400 n-grams). As will be explained in greater detail below, the dimensionality of the plurality of vectors may also match the smaller dimensionality when comparing the representative vector with the plurality of vectors.

Returning to FIG. 3, at step 310 one or more of the systems described herein may identify the character encoding of the text stream based on identifying a similarity between the representative vector and a neighboring vector within the plurality of vectors representing the character encoding. For example, at step 310 similarity module 112 may, as part of computing device 202 in FIG. 2, identify encoding 260 of text stream 220 based on identifying a similarity between vector 250 and a neighboring vector within vectors 240 representing encoding 260.

Similarity module 112 may determine the similarity between the representative vector and the neighboring vector in any suitable manner. For example, similarity module 112 may compute a pairwise cosine similarity. In some examples, similarity module 112 may identify the neighboring vector by determining that the neighboring vector is the nearest neighbor to the representative vector within the vector space. For example, similarity module 112 may compute a pairwise cosine similarity between the representative vector and each vector within the plurality of vectors to identify the nearest neighbor.

As mentioned earlier, in some examples one or more of the systems described herein may use a first dimensionality for the plurality of vectors when generating the representative vector (e.g., when calculating the inverse document frequency of n-grams across the plurality of vectors). In these examples, similarity module 112 may identify the similarity between the representative vector and the neighboring vector based on the plurality of vectors being represented with a second dimensionality that is smaller than the first dimensionality. In this manner, the systems described herein may calculate an inverse document frequency with higher precision without comparing the representative vectors with the plurality of vectors with unnecessary precision.

In some examples, similarity module 112 may identify a character encoding that includes a first character set used within a first language but not a second language and a second character set used within the second language but not the first language. For example, the text stream may include 90 percent English text and 10 percent Chinese text. Once the n-grams frequencies for the representative vector are weighted, the relative importance of the Chinese portions may increase due to the Chinese characters appearing in fewer character encodings. Accordingly, similarity module 112 may correctly identify a character encoding with multiple character sets for different languages (e.g., the CP936 character encoding).

In some examples, one or more of the systems described herein may use the character encoding with the text stream. For example, an encoding module may render the text stream according to the character encoding of the text stream. Additionally or alternatively, the encoding module may analyze textual content of the text stream according to the character encoding of the text stream (e.g., to perform a natural language processing task, topic extraction, data mining, etc.).

As explained above, by giving greater weight to data sequences that are uncommon across character encodings when selecting features of text streams to compare with features of character encodings, the systems and methods described herein may use high-information features of text streams to distinguish between potentially similar candidate character encodings. Accordingly, in some examples, these systems and methods may more accurately identify character encodings for text streams with multiple languages.

Figure 5:
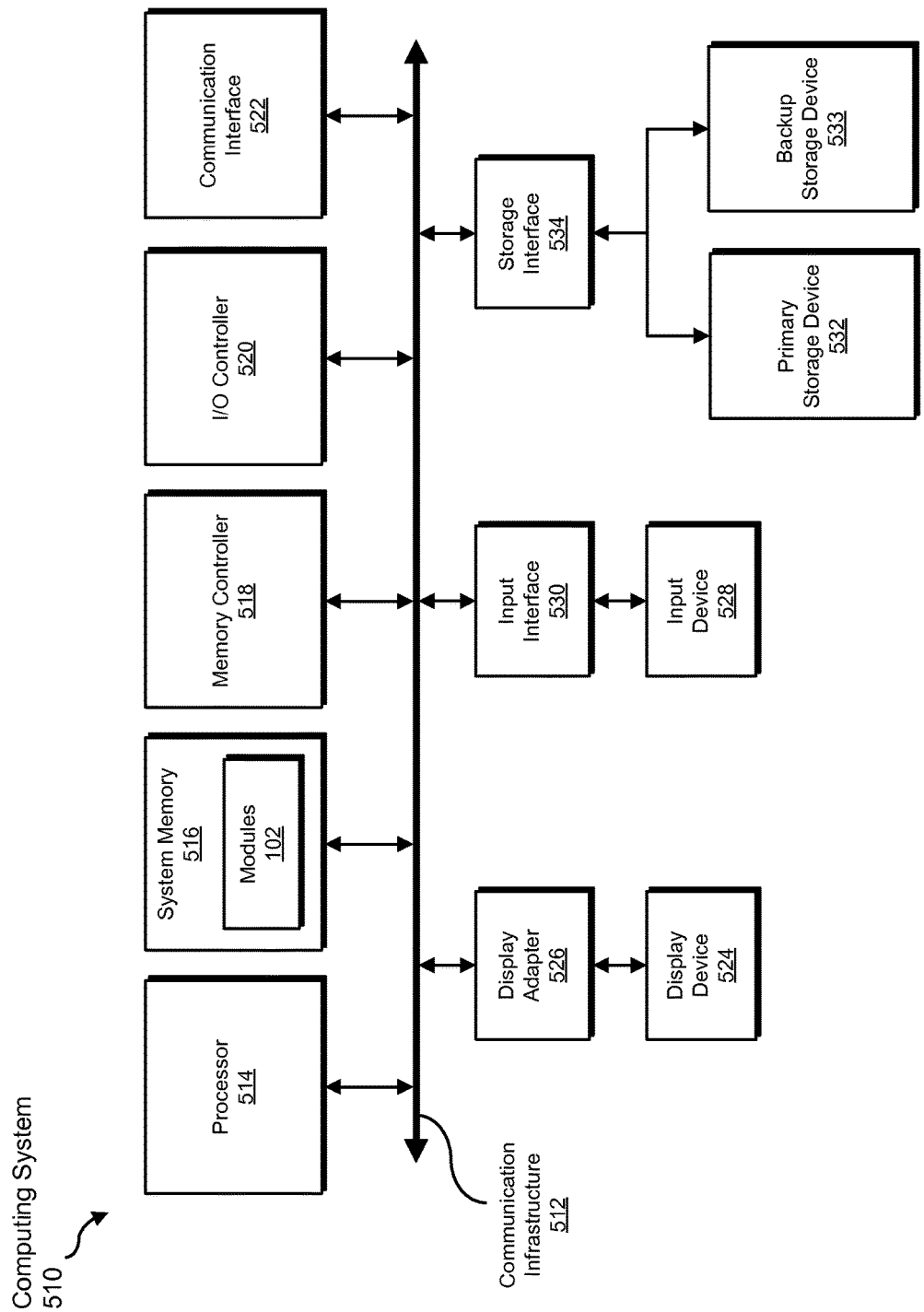
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, dividing, weighting, generating, populating, rendering, and analyzing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
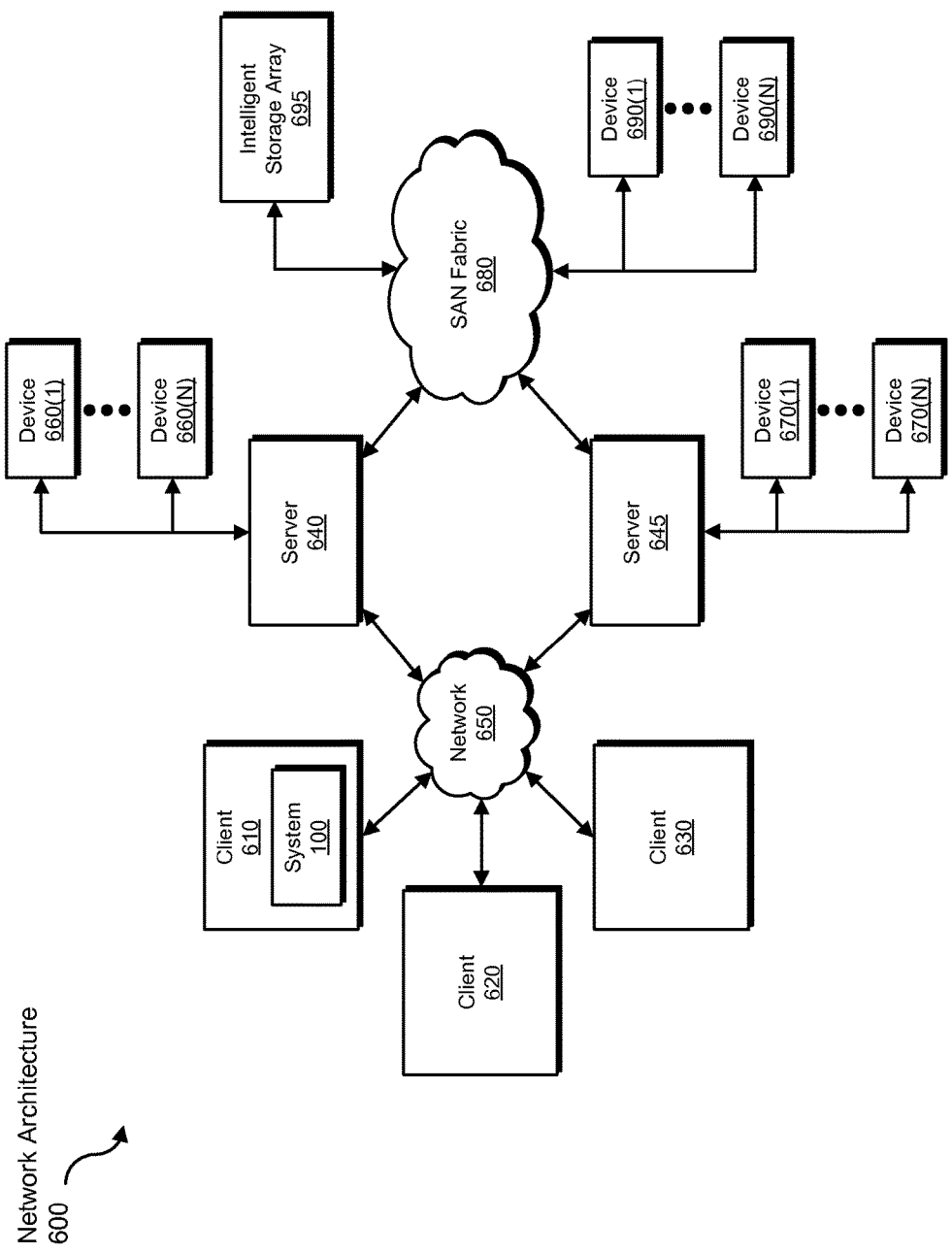
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, dividing, weighting, generating, populating, rendering, and analyzing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting character encodings of text streams.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for detecting character encodings of text streams. As another example, one or more of the modules recited herein may transform a text stream into a correctly encoded text stream.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting character encodings of text streams, at least a portion of the method being performed by a computing device comprising at least one processor, the method comprising:
   identifying a request to identify a character encoding of a text stream;
   dividing the text stream to identify a plurality of n-grams within the text stream;
   identifying a plurality of vectors within a vector space, each vector representing a potential character encoding by a plurality of expected n-grams within the potential character encoding;
   generating, based at least in part on the plurality of n-grams within the text stream and based at least in part on an inverse frequency of appearance of each of the plurality of n-grams within the plurality of vectors, a representative vector describing the text stream;
   identifying the character encoding of the text stream based on identifying a similarity between the representative vector and a neighboring vector within the plurality of vectors representing the character encoding.

2. The computer-implemented method of claim 1, wherein generating the representative vector describing the text stream comprises, for each n-gram within the plurality n-grams, generating an importance value for the n-gram by:
   identifying a term frequency with which the n-gram appears in the text stream;
   identifying the inverse frequency of appearance of the n-gram by calculating a logarithm of an inverse of a proportion of vectors within the plurality of vectors including the n-gram;
   weighting the term frequency by the inverse frequency of appearance.

3. The computer-implemented method of claim 1, wherein:
   generating the representative vector describing the text stream comprises generating the representative vector based on the plurality of vectors being represented with a first dimensionality;
   identifying the similarity between the representative vector and the neighboring vector comprises identifying the similarity between the representative vector and the neighboring vector based on the plurality of vectors being represented with a second dimensionality that is smaller than the first dimensionality.

4. The computer-implemented method of claim 1, wherein generating the representative vector describing the text stream comprises:
   identifying a target dimensionality of the representative vector;
   identifying a weighted term frequency with which each n-gram within the plurality of n-grams appears in the text stream;
   identifying a subset of the plurality of n-grams with highest weighted term frequencies;
   populating the representative vector with the subset of the plurality of n-grams.

5. The computer-implemented method of claim 1, wherein identifying the request to identify the character encoding of the text stream comprises at least one of:
   determining that the text stream lacks a metadata indicator of a defined character encoding for the text stream;
   determining that the metadata indicator of the of the defined character encoding for the text stream is incorrect.

6. The computer-implemented method of claim 1, wherein identifying the request to identify the character encoding of the text stream comprises determining that a probability that the text stream comprises more than one language is above a predetermined threshold.

7. The computer-implemented method of claim 1, further comprising at least one of:
   rendering the text stream according to the character encoding of the text stream;
   analyzing textual content of the text stream according to the character encoding of the text stream.

8. The computer-implemented method of claim 1, wherein identifying the character encoding of the text stream based on identifying the similarity between the representative vector and the neighboring vector comprises determining that the neighboring vector is the nearest neighbor to the representative vector within the vector space.

9. The computer-implemented method of claim 1, wherein identifying the character encoding of the text stream comprises identifying a character encoding that comprises:
   a first character set used within a first language but not a second language;
   a second character set used within the second language but not the first language.

10. A system for detecting character encodings of text streams, the system comprising:
    an identification module programmed to identify a request to identify a character encoding of a text stream;
    a division module programmed to divide the text stream to identify a plurality of n-grams within the text stream;
    a vector module programmed to identify a plurality of vectors within a vector space, each vector representing a potential character encoding by a plurality of expected n-grams within the potential character encoding;
    a generation module programmed to generate, based at least in part on the plurality of n-grams within the text stream and based at least in part on an inverse frequency of appearance of each of the plurality of n-grams within the plurality of vectors, a representative vector describing the text stream;
    a similarity module programmed to identify the character encoding of the text stream based on identifying a similarity between the representative vector and a neighboring vector within the plurality of vectors representing the character encoding;
    at least one processor configured to execute the identification module, the division module, the vector module, the generation module, and the similarity module.

11. The system of claim 10, wherein the generation module is programmed to generate the representative vector describing the text stream by, for each n-gram within the plurality n-grams, generating an importance value for the n-gram by:
    identifying a term frequency with which the n-gram appears in the text stream;
    identifying the inverse frequency of appearance of the n-gram by calculating a logarithm of an inverse of a proportion of vectors within the plurality of vectors including the n-gram;
    weighting the term frequency by the inverse frequency of appearance.

12. The system of claim 10, wherein:
- the generation module is programmed to generate the representative vector describing the text stream by generating the representative vector based on the plurality of vectors being represented with a first dimensionality;
- the similarity module is programmed to identify the similarity between the representative vector and the neighboring vector by identifying the similarity between the representative vector and the neighboring vector based on the plurality of vectors being represented with a second dimensionality that is smaller than the first dimensionality.

13. The system of claim 10, wherein the generation module is programmed to generate the representative vector describing the text stream by:
- identifying a target dimensionality of the representative vector;
- identifying a weighted term frequency with which each n-gram within the plurality of n-grams appears in the text stream;
- identifying a subset of the plurality of n-grams with highest weighted term frequencies;
- populating the representative vector with the subset of the plurality of n-grams.

14. The system of claim 10, wherein the identification module is programmed to identify the request to identify the character encoding of the text stream by at least one of:
- determining that the text stream lacks a metadata indicator of a defined character encoding for the text stream;
- determining that the metadata indicator of the of the defined character encoding for the text stream is incorrect.

15. The system of claim 10, wherein the identification module is programmed to identify the request to identify the character encoding of the text stream by determining that a probability that the text stream comprises more than one language is above a predetermined threshold.

16. The system of claim 10, further comprising an encoding module programmed to at least one of:
- rendering the text stream according to the character encoding of the text stream;
- analyzing textual content of the text stream according to the character encoding of the text stream.

17. The system of claim 10, wherein the similarity module is programmed to identify the character encoding of the text stream based on identifying the similarity between the representative vector and the neighboring vector by determining that the neighboring vector is the nearest neighbor to the representative vector within the vector space.

18. The system of claim 10, wherein the similarity module is programmed to identify the character encoding of the text stream by identifying a character encoding that comprises:
- a first character set used within a first language but not a second language;
- a second character set used within the second language but not the first language.

19. A computer-readable-storage medium comprising one or more computer-executable instructions that, when executed by at least one processor of a computing device, cause the computing device to:
- identify a request to identify a character encoding of a text stream;
- divide the text stream to identify a plurality of n-grams within the text stream;
- identify a plurality of vectors within a vector space, each vector representing a potential character encoding by a plurality of expected n-grams within the potential character encoding;
- generate, based at least in part on the plurality of n-grams within the text stream and based at least in part on an inverse frequency of appearance of each of the plurality of n-grams within the plurality of vectors, a representative vector describing the text stream;
- identify the character encoding of the text stream based on identifying a similarity between the representative vector and a neighboring vector within the plurality of vectors representing the character encoding.

20. The computer-readable storage medium of claim 19, wherein the one or more computer-executable instructions cause the computing device to generate the representative vector describing the text stream by causing the device to, for each n-gram within the plurality n-grams, generate an importance value for the n-gram by:
- identifying a term frequency with which the n-gram appears in the text stream;
- identifying the inverse frequency of appearance of the n-gram by calculating a logarithm of an inverse of a proportion of vectors within the plurality of vectors including the n-gram;
- weighting the term frequency by the inverse frequency of appearance.

* * * * *